United States Patent
Akama et al.

(10) Patent No.: US 9,810,120 B2
(45) Date of Patent: Nov. 7, 2017

(54) EXHAUST GAS PURIFYING SYSTEM

(75) Inventors: Hiroshi Akama, Zushi (JP); Hitoshi Onodera, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 834 days.

(21) Appl. No.: 12/671,056

(22) PCT Filed: Jul. 29, 2008

(86) PCT No.: PCT/JP2008/002015
§ 371 (c)(1),
(2), (4) Date: Jan. 28, 2010

(87) PCT Pub. No.: WO2009/016822
PCT Pub. Date: Feb. 5, 2009

(65) Prior Publication Data
US 2010/0199635 A1  Aug. 12, 2010

(30) Foreign Application Priority Data

Aug. 1, 2007  (JP) .................................. 2007-201016
Apr. 11, 2008  (JP) .................................. 2008-103684

(51) Int. Cl.
*F01N 3/00* (2006.01)
*F01N 3/20* (2006.01)
(Continued)

(52) U.S. Cl.
CPC ......... *F01N 3/2013* (2013.01); *F01N 3/0807* (2013.01); *F01N 3/0814* (2013.01);
(Continued)

(58) Field of Classification Search
CPC .... F01N 11/007; F01N 13/009; F01N 3/0807; F01N 3/0871
(Continued)

(56) References Cited

U.S. PATENT DOCUMENTS 3,637,344 A    1/1972  Thompson
5,664,049 A *  9/1997  Kondo et al. ................. 392/485
(Continued)

FOREIGN PATENT DOCUMENTS

DE    10 2004 012 272 A1    9/2004
EP         0 766 993 A2      4/1997
(Continued)

OTHER PUBLICATIONS

Korean Office Action, Feb. 9, 2015, 6 pages.

*Primary Examiner* — Mark Laurenzi
*Assistant Examiner* — Anthony Ayala Delgado
(74) *Attorney, Agent, or Firm* — Foley & Lardner LLP

(57) ABSTRACT

An exhaust gas purifying system includes: a NOx trapping agent (2) which adsorbs nitrogen oxide when an excess air ratio of exhaust gas is more than 1, and releases nitrogen oxide when the excess air ratio is 1 or less; a NOx purifying catalyst (13) which reduces nitrogen oxide to nitrogen; and an oxygen concentration controller which controls oxygen concentration in the exhaust gas. When the excess air ratio of the exhaust gas is more than 1, nitrogen oxide is adsorbed to the NOx trapping agent (2). When the excess air ratio of the exhaust gas is 1 or less, the oxygen concentration controller controls the oxygen concentration of the exhaust gas at an inlet of the NOx purifying catalyst between 0.8 and 1.5% by volume, so that the NOx purifying catalyst reduces nitrogen oxide released from the NOx trapping agent.

7 Claims, 12 Drawing Sheets

(51) Int. Cl.
- *F01N 3/08* (2006.01)
- *F01N 9/00* (2006.01)
- *F01N 11/00* (2006.01)
- *F02D 41/02* (2006.01)
- *F01N 13/00* (2010.01)

(52) U.S. Cl.
CPC ......... *F01N 3/0835* (2013.01); *F01N 3/0842* (2013.01); *F01N 3/0871* (2013.01); *F01N 9/00* (2013.01); *F01N 11/007* (2013.01); *F01N 13/009* (2014.06); *F02D 41/0275* (2013.01); *F01N 2240/16* (2013.01); *F01N 2370/04* (2013.01); *F01N 2430/06* (2013.01); *F01N 2510/06* (2013.01); *F01N 2510/063* (2013.01); *F01N 2510/0682* (2013.01); *F01N 2560/023* (2013.01); *F01N 2560/026* (2013.01); *F01N 2570/12* (2013.01); *F01N 2570/14* (2013.01); *F02D 2200/0806* (2013.01); *Y02T 10/24* (2013.01); *Y02T 10/26* (2013.01); *Y02T 10/47* (2013.01)

(58) Field of Classification Search
USPC .................................. 60/295, 285, 297, 286
See application file for complete search history.

(56) References Cited

U.S. PATENT DOCUMENTS

| | | | |
|---|---|---|---|
| 6,079,203 A * | 6/2000 | Wakamoto | F01N 3/2066 60/274 |
| 6,167,696 B1 * | 1/2001 | Maaseidvaag et al. | 60/274 |
| 6,367,246 B1 * | 4/2002 | Hirota et al. | 60/295 |
| 6,589,901 B2 * | 7/2003 | Yamamoto et al. | 502/65 |
| 6,887,444 B1 | 5/2005 | Yamamoto | |
| 7,114,328 B2 * | 10/2006 | Nagaoka et al. | 60/285 |
| 2003/0115859 A1 | 6/2003 | Deeba | |
| 2003/0126857 A1 * | 7/2003 | Kitahara | 60/278 |
| 2003/0134743 A1 * | 7/2003 | Sumida et al. | 502/304 |
| 2004/0154285 A1 * | 8/2004 | Nagaoka et al. | 60/285 |
| 2005/0247047 A1 * | 11/2005 | Takaya et al. | 60/284 |
| 2006/0179825 A1 | 8/2006 | Hu et al. | |
| 2007/0028601 A1 * | 2/2007 | Duvinage et al. | 60/286 |

FOREIGN PATENT DOCUMENTS

| | | |
|---|---|---|
| EP | 0 852 966 A1 | 7/1998 |
| EP | 0 984 142 A1 | 3/2000 |
| EP | 1 057 983 A1 | 12/2000 |
| EP | 1 544 428 A1 | 6/2005 |
| EP | 1340537 B1 | 11/2005 |
| JP | 10-331625 A | 12/1998 |
| JP | 2001-212464 | 8/2001 |
| JP | 2002-282697 A | 10/2002 |
| JP | 2003-035135 A | 2/2003 |
| JP | 2003-206758 A | 7/2003 |
| JP | 2003-206785 A | 7/2003 |
| JP | 2003-311152 A | 11/2003 |
| JP | 2004-243272 A | 9/2004 |
| JP | 3741303 B2 | 11/2005 |
| JP | 2006-233832 A | 9/2006 |
| JP | 2006-316718 A | 11/2006 |
| JP | 3918402 B2 | 2/2007 |

\* cited by examiner

EXHAUST GAS PURIFYING SYSTEM

TECHNICAL FIELD

The present invention relates to an exhaust gas purifying system which purifies an exhaust gas discharged from an internal combustion engine. Particularly, the present invention relates to an exhaust gas purifying system capable of effectively purifying an exhaust gas discharged from an internal combustion engine during lean burn operation.

BACKGROUND ART

In recent years, since a demand to reduce carbon dioxide ($CO_2$) emissions is increasing for global environmental concern, lean-burn operation has been aimed to improve fuel efficiency of an internal combustion engine for a vehicle. Meanwhile, nitrogen oxide (NOx) cannot be substantially reduced by conventional three-way catalysts because exhaust gas from lean burn engines using gasoline, direct-injection engines and diesel engines contains a lot of oxygen because of lean combustion. Now, diverse technological developments have been enhanced to efficiently purify the exhaust gas from engines, especially from diesel engines.

One of the effective ways for such purification is to use a NOx trap catalyst. The NOx trap catalyst traps nitrogen oxide in the exhaust gas when an air-fuel ratio of the incoming exhaust gas is under lean condition, and releases and reduces the trapped nitrogen oxide when the air-fuel ratio of the incoming exhaust gas is under theoretical (stoichiometric) or rich condition. Thus, the trapped NOx is released and reduced by making the air-fuel ratio of the exhaust gas theoretical or rich before exceeding the allowable trapped amount of nitrogen oxide. Then, nitrogen oxide is reduced by increased reductants (hydrogen ($H_2$), carbon monoxide (CO), hydrocarbons (HC)). However, it is well known that excessive reductants, especially excessive hydrocarbons, can cause environmental deterioration if they are discharged without being used for reduction of nitrogen oxide. Furthermore, it is undesirable that the air-fuel ratio of the exhaust gas is rapidly shifted to theoretical or rich to increase the reductants because it results in worsening driving performances and lowering fuel efficiency.

Accordingly, it has been attempted that hydrogen is especially used as a more effective reductant for reducing nitrogen oxide. Also, it has been suggested a catalyst producing hydrogen by steam reforming (see Patent Citation 1).
Patent Citation 1: Japanese Patent No. 3741303

However, since the steam reforming reaction is an endothermic reaction, heat supply is needed to get a sufficient reaction speed, i.e. it is required to bring catalysts under high temperature condition. Therefore, this is hardly a practical solution in order to bring a sufficient effect of nitrogen oxide purification under actual driving conditions. In addition, it results in environmental deterioration by making the air-fuel ratio of the exhaust richer so as to enhance a reduction ratio of nitrogen oxide because of the increase of discharge amounts of unreacted hydrocarbons. Therefore, it is necessary to increase catalysts more to remove hydrocarbons. Thus, it has been suggested to provide a HC adsorbing catalyst in addition to the NOx trap catalyst (see Patent Citation 2).
Patent Citation 2: Japanese Patent Unexamined Publication No. 2003-206785

Another method has been suggested that a hydrocarbon adsorbent and a steam reforming catalyst are combined so as to purify hydrocarbons by using water under less oxygen condition (e.g. see Patent Citation 3).
Patent Citation 3: Japanese Patent Unexamined Publication No. 2002-282697

Patent Citation 3 shows a good result in the model experiment under a low space velocity (SV) using poorly-adsorbing methane. Also, experiments using engines have been performed, in which air-fuel ratios are around theoretical (A/F=13.5-15.5) with a three-way catalyst in addition to the hydrocarbon adsorbent and the steam reforming catalyst. However, an ability of release and purification of hydrocarbons is 40%, which is relatively low. In addition, an ability of reduction of nitrogen oxide is unclear. An effect of the combination of the NOx trap catalyst and the HC adsorbing catalyst is also obscure.

DISCLOSURE OF INVENTION

In the conventional methods as described above, it is difficult to ensure compatibility between reduction of nitrogen oxide and oxidation of hydrocarbons. Therefore, lowering fuel efficiency and requiring a large amount of catalyst storage and quantity is unavoidable in order to purify the exhaust gas.

The present invention has been made focusing on the above-mentioned conventional problems. An object of the present invention is to provide an exhaust gas purifying system capable of achieving compact catalyst systems and ensuring compatibility between reduction of nitrogen oxide and oxidation of hydrocarbons.

The first aspect of the present invention provides an exhaust gas purifying system for an internal combustion engine, the system including: a NOx trapping agent which adsorbs nitrogen oxide when an excess air ratio of exhaust gas is more than 1, and releases nitrogen oxide when the excess air ratio is 1 or less; a NOx purifying catalyst which reduces nitrogen oxide to nitrogen; and an oxygen concentration controller which controls oxygen concentration in the exhaust gas, wherein, when the excess air ratio of the exhaust gas is more than 1, nitrogen oxide is adsorbed to the NOx trapping agent, and when the excess air ratio of the exhaust gas is 1 or less, the oxygen concentration controller controls the oxygen concentration of the exhaust gas at an inlet of the NOx purifying catalyst between 0.8 and 1.5% by volume, so that the NOx purifying catalyst reduces nitrogen oxide released from the NOx trapping agent.

The second aspect of the present invention provides An exhaust gas purifying method for an internal combustion engine, the method including: providing an exhaust gas purifying system for the internal combustion engine, the system including: a NOx trapping agent which adsorbs nitrogen oxide when an excess air ratio of exhaust gas is more than 1, and releases nitrogen oxide when the excess air ratio is 1 or less; a NOx purifying catalyst which reduces nitrogen oxide to nitrogen; and an oxygen concentration controller which controls oxygen concentration in the exhaust gas; adsorbing nitrogen oxide to the NOx trapping agent when the excess air ratio of the exhaust gas is more than 1; and controlling the oxygen concentration of the exhaust gas at an inlet of the NOx purifying catalyst between 0.8 and 1.5% by volume by the oxygen concentration controller, thereby reducing nitrogen oxide released from the NOx trapping agent by the NOx purifying catalyst.

BEST MODE FOR CARRYING OUT THE INVENTION

Figure 1:
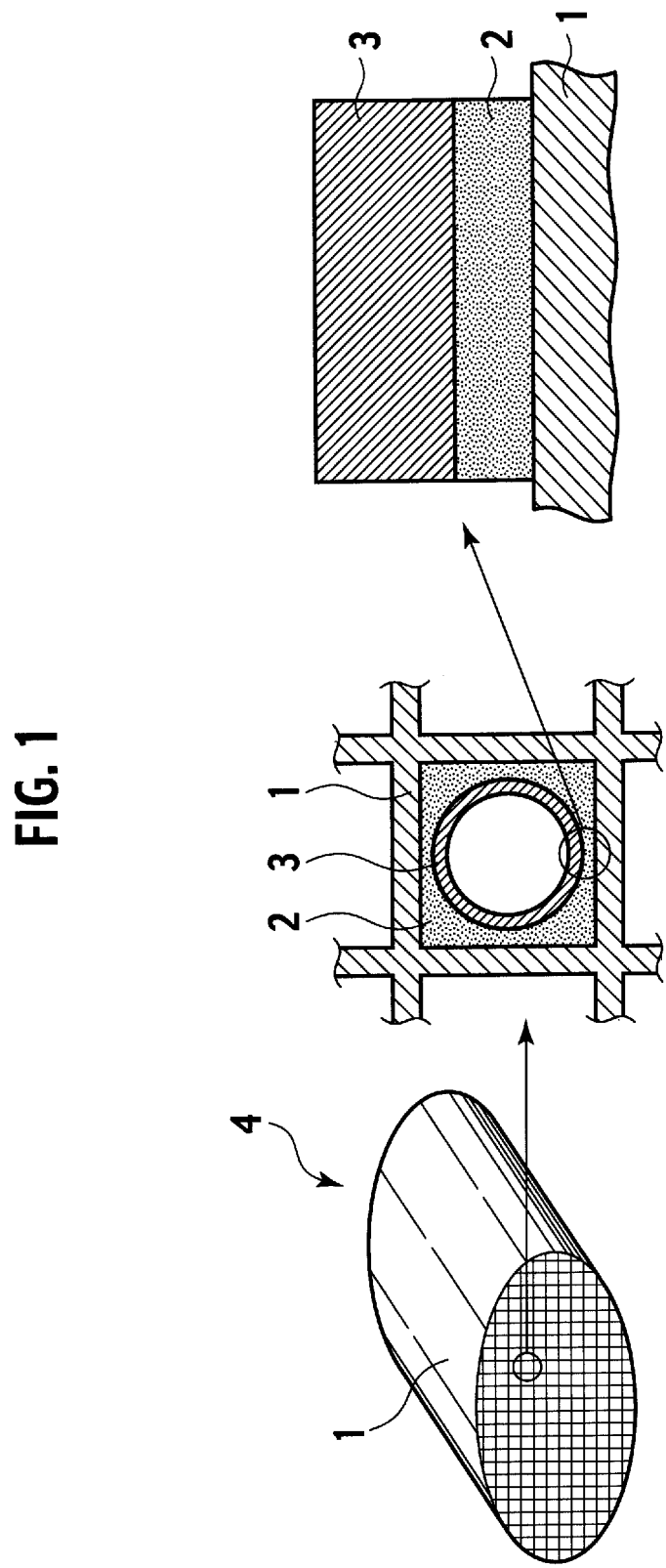
FIG. 1 is a perspective view and a cross-sectional view showing an example of a catalyst used for an exhaust gas purifying system of the present invention.

Hereinafter, an exhaust gas purifying system according to the present invention will be described in detail. Note that, in this specification, "%" added to values of concentrations, contents and the like represents a mass percentage unless otherwise specified.

An exhaust gas purifying system of the present invention is a system for purifying an exhaust gas from an internal combustion engine. This system includes a NOx trapping agent, a NOx purifying catalyst, and an oxygen concentration controller which controls oxygen concentration in the exhaust gas. In addition, this system includes a HC trapping agent which adsorbs and releases hydrocarbons as necessary. The exhaust gas purifying system of the present invention has been made by providing the HC trapping agent, the NOx trapping agent, the NOx purifying catalyst or the like in an exhaust passage of the internal combustion engine.

As the NOx trapping agent, the NOx purifying catalyst and the HC trapping agent, the following materials may be used. The NOx trapping agent may include, but not limited to, alkali metals, alkaline-earth metals, and also rare-earth oxide, as long as it is possible to adsorb or release nitrogen oxide along with fluctuations of the excess air ratio (lambda) as mentioned above. For example, oxides such as barium (Ba), magnesium (Mg), sodium (Na), cerium (Ce) and samarium (Sm) may be suitably used for the NOx trapping agent. Also, these alkali metals, alkaline-earth metals and rare-earth oxide may be supported on a heat-resistant inorganic oxide (carrier) such as alumina and zirconia. By supporting these alkali metals, alkaline-earth metals and rare-earth oxide on the carrier, it enables a specific surface area of oxides to increase, and an ability of the NOx trapping agent to work effectively.

The NOx purifying catalyst will be adequate to be able to enhance a production of hydrogen ($H_2$) and carbon monoxide (CO) from hydrocarbons by using a small amount of oxygen ($O_2$) of 0.8 to 1.5% by volume as mentioned above. That means it is preferable that the NOx purifying catalyst can produce $H_2$ and CO by selective partial oxidation of hydrocarbons. Particularly, the NOx purifying catalyst may be made of platinum (Pt), rhodium (Rh), palladium (Pd), copper (Cu), iron (Fe), cobalt (Co), manganese (Mn) or zinc (Zn), and optional mixtures of these materials. Also, these catalytic metals can be used being supported on the heat-resistant inorganic oxide (carrier) such as alumina and zirconia so that the specific surface area of these catalytic metals increases and hydrocarbons can be partially oxidized more efficient by a small amount of oxygen. Besides, it is preferable that the NOx purifying catalyst may exert the above-mentioned effects with activation at a temperature of 200 degrees Celsius or higher.

The HC trapping agent may include, but not limited to, MFI zeolite and beta zeolite, as long as it is possible to adsorb and release hydrocarbons in the exhaust gas. In particular, at least one of MFI zeolite and beta zeolite with a silica-alumina ratio between 20 and less than 60 is suitably used as the HC trapping agent. Also, MFI zeolite and beta zeolite may be used by mixture. Meanwhile, the silica-alumina ratio is a molar ratio, and it is preferable in the proportion of 1 molar of alumina to between 20 molar and less than 60 molar of silica in the HC trapping agent. In the exhaust gas purifying system of the present invention, hydrocarbons are adsorbed to the HC trapping agent when hydrocarbons are under released temperature in the HC trapping agent.

The HC trapping agent, the NOx trapping agent and the NOx purifying catalyst may be provided individually in the exhaust gas purifying system of the present invention. Also, it is possible to provide a combination of two or three selected from the HC trapping agent, the NOx trapping agent and the NOx purifying catalyst. For example, it is possible to prepare a HC trap-NOx trap-purifying catalyst combined a HC trapping function, a NOx trapping function and a NOx purifying function, or to prepare a NOx trap-purifying catalyst combined the NOx trapping agent and the NOx purifying catalyst, or to prepare a HC trap-NOx purifying catalyst combined the HC trapping agent and the NOx purifying catalyst. Thus, it is able to reduce the number of components in the system as a whole. Accordingly, compact catalysts and systems can be achieved.

In the above-mentioned combinations, it is preferable that the HC trapping agent is isolated from the NOx trapping agent and hydrocarbons released from the HC trapping agent are supplied to pass through the NOx trap-purifying catalyst based on the perspective of sufficiently achieving the trapping effect of the NOx trapping agent. It is effective to combine, for instance, the HC trapping agent provided on an upstream side in the exhaust passage and the NOx trap-purifying catalyst provided downstream of the HC trapping agent.

Also, it is effective to combine a HC trapping agent layer made of the HC trapping agent provided on a honeycomb monolithic substrate as a lower layer, and a NOx trap-purifying catalyst layer made of the NOx trap-purifying catalyst with the NOx trapping function and the NOx purifying function provided as an upper layer.

Moreover, it is effective to have a three-layered structure provided with the HC trapping agent layer as a lower layer, a coexistent layer formed with the combination of the NOx trapping agent and the HC trapping agent as a middle layer, and the NOx trap-purifying catalyst layer as an upper layer.

Furthermore, it is possible to have a three-layered structure provided with a NOx trapping agent layer made of the NOx trapping agent as a lower layer, the HC trapping agent layer as a middle layer, and the NOx trap-purifying catalyst layer as an upper layer.

In the exhaust gas purifying system of the present invention, the HC trapping agent, the NOx trapping agent and the NOx purifying catalyst are generally prepared in powder form. Then, each powder is used being supported on the monolithic substrate in layers. Alternatively, each of the HC trapping agent, the NOx trapping agent and the NOx purifying catalyst may be grained or pelletized and filled in a container such as a catalyst container.

If the HC trapping agent, the NOx trapping agent and the NOx purifying catalyst are used while being supported on the monolithic substrate, each of the HC trapping agent, the NOx trapping agent and the NOx purifying catalyst may be used individually to form the HC trapping agent layer, the NOx trapping agent layer and NOx purifying catalyst layer respectively per monolithic substrate. Also, the HC trapping agent, the NOx trapping agent and the NOx purifying catalyst may be combined to form one layer as a HC trap-NOx trap-purifying catalyst layer. From the aspect of achieving high NOx trapping efficiency, however, it is preferable to have a double-layered structure provided with the HC trapping agent layer as a lower layer and the NOx trap-purifying catalyst layer formed with the combination of the NOx trapping agent and the NOx purifying catalyst as an upper layer. Thus, it makes the catalyst itself and the system as a whole more compact by providing a plurality of catalyst layers on one monolithic substrate.

While, in the present invention, since each of the HC trapping agent layer, the NOx trapping agent layer, the NOx trap-purifying catalyst layer or the like is not limited to one layer on one monolithic substrate, the respective layers may be composed of a plurality of layers, and also may have different compositions or elements even mutually assuming the same function. For instance, two of the NOx trap-purifying catalyst layers may be coexistent, each of which may have different constituents of the NOx trapping agent and the NOx purifying catalyst respectively.

If a plurality of layers is provided in the present invention, it is preferable to provide the HC trapping agent layer containing the HC trapping agent on the monolithic substrate as a lower layer, and provide the NOx trap-purifying catalyst layer containing the NOx trapping agent and the NOx purifying catalyst on the HC trapping agent layer as an upper layer. By adopting the above-mentioned layer construction, the trapped hydrocarbons are effectively used for the reduction of nitrogen oxide while keeping a high trapping ability.

In addition, it may be arranged by any combination of the HC trapping agent, the NOx trapping agent and the NOx purifying catalyst in the exhaust passage in the present invention. In this case, it is preferable to provide the HC trapping agent on the upstream side in the exhaust passage and provide the NOx trap-purifying catalyst containing the NOx trapping agent and NOx purifying catalyst downstream of the HC trapping agent. With this longitudinal arrangement, hydrocarbons can be trapped upstream, and therefore, it makes the NOx trap effectively workable, and also it makes trapped hydrocarbons effectively-used for the reduction of nitrogen oxide. It may also use the monolithic substrate in such a longitudinal arrangement as well.

Moreover, when each type of layers such as catalyst layers is formed as described above, carriers with the high specific surface area such as alumina and promoter components such as ceria may be used.

FIG. 1 shows an example of an exhaust gas purifying catalyst used for an exhaust gas purifying system of the present invention. In FIG. 1, an exhaust gas purifying catalyst 4 includes a multi-layer structure. Namely, a zeolite layer 2 is formed on a honeycomb monolithic substrate 1 as the HC trapping agent layer. Also, a NOx trap-purifying catalyst 3 with a single layer structure including a combination of the NOx trapping agent and the NOx purifying catalyst is formed on the zeolite layer 2.

Figure 2:
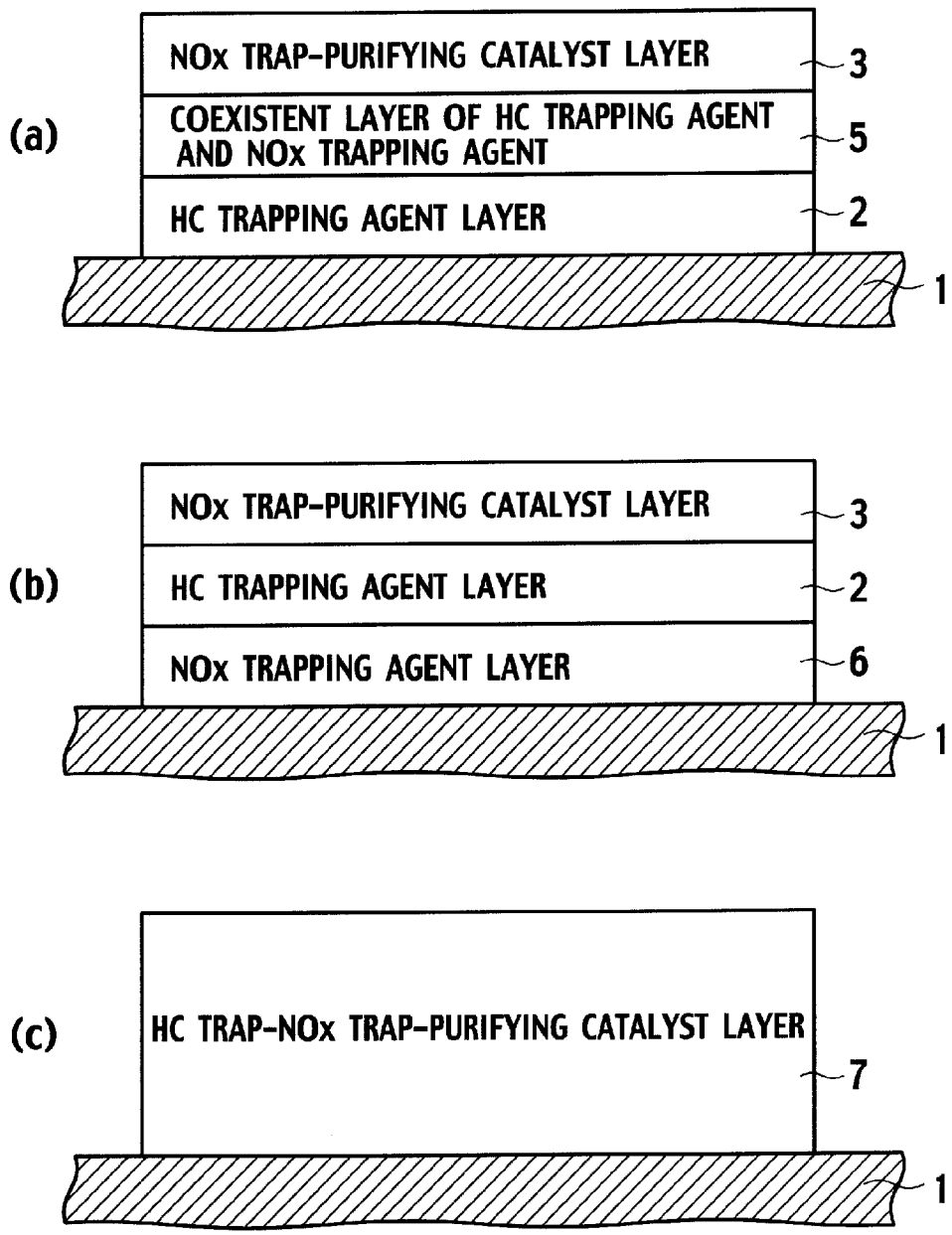
FIG. 2 is a cross-sectional view showing another example of a catalyst used for an exhaust gas purifying system of the present invention.

In addition, catalysts shown in (a) to (c) of FIG. 2 may be used for the exhaust gas purifying system of the present invention. As shown in FIG. 2(a), it may have a three-layered structure provided with the HC trapping agent layer 2 on the honeycomb monolithic substrate 1 as a lower layer, a coexistent layer 5 formed with a combination of the NOx trapping agent and a HC trapping agent as a middle layer, and the NOx trap-purifying catalyst layer 3 as an upper layer. Also, as shown in FIG. 2(b), it may have a three-layered structure provided with a NOx trapping agent layer 6 on the honeycomb monolithic substrate 1 as a lower layer, the HC trapping agent layer 2 as a middle layer, and the NOx trap-purifying catalyst layer 3 as an upper layer. And also, as shown in FIG. 2(c), it may have a single layer structure provided with a HC trap-NOx trap-purifying catalyst layer 7 formed with the combination of the HC trapping agent, the NOx trapping agent and the NOx purifying catalyst on the honeycomb monolithic substrate.

Figure 3:
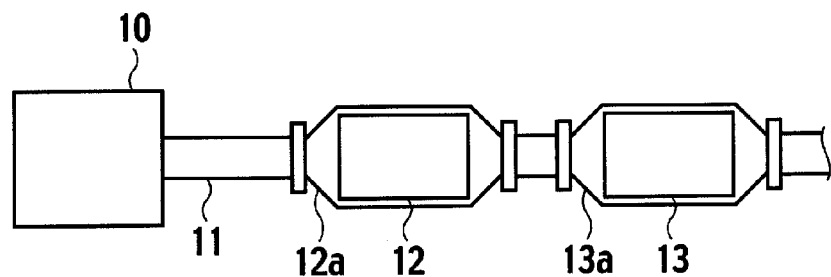
FIG. 3 is a schematic view showing still another example of a catalyst used for an exhaust gas purifying system of the present invention.

Moreover, in the exhaust gas purifying system of the present invention as described above, it may be arranged by any combination of the HC trapping agent, the NOx trapping agent and the NOx purifying catalyst in the exhaust passage. In particular, as shown in FIG. 3, a HC trap catalyst 12 supported the HC trapping agent on the honeycomb monolithic substrate may be provided in an exhaust passage 11 of an engine 10, and a NOx trap-purifying catalyst 13 supported the NOx trapping agent and the NOx purifying catalyst on the monolithic substrate may be provided downstream of the HC trap catalyst 12. With regard to the NOx trap-purifying catalyst 13, it may be a single layer structure provided with the NOx trap-purifying catalyst formed with the combination of the NOx trapping agent and the NOx purifying catalyst. While, it may be a double-layered structure that each of the NOx trapping agent and the NOx purifying catalyst is formed a NOx trapping agent layer and a NOx purifying catalyst layer respectively. Also, it is preferable that the HC trap catalyst 12 and the NOx trap-purifying catalyst 13 are kept in a casing 12a, 13a made of metal and fixed to the exhaust passage 11 from the aspect of improving endurance and facility of arrangement to the exhaust passage 11.

The following is an explanation of a mechanism for purifying the exhaust gas by the exhaust gas purifying system of the present invention. A technical scope of the present invention, however, is not limited to the embodiment which achieves effects by the mechanism.

Figure 4:
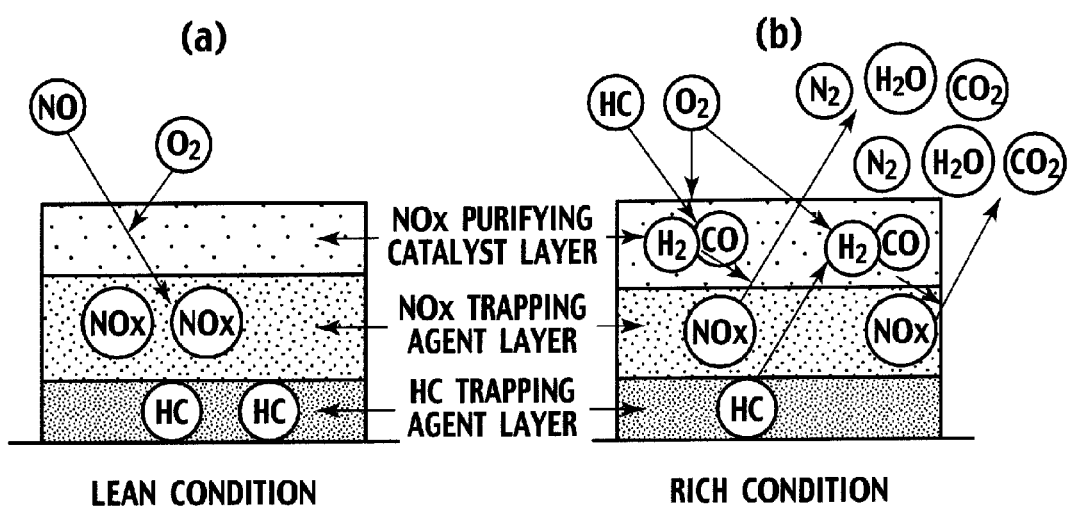
FIG. 4 is an explanatory view showing purifying mechanism of an exhaust gas purifying system of the present invention.

An engine with the above-mentioned exhaust gas purifying system operates to repeat a lean-burn and a rich-burn depending on an engine load. Under a lean condition, as shown in FIG. 4(a), nitrogen monoxide (NO) in the exhaust gas is oxidized to nitrogen dioxide ($NO_2$) by the catalytic metal in the NOx purifying catalyst layer, and then adsorbed to the NOx trapping agent layer. While under rich condition, a small amount of oxygen ($O_2$), which is controlled by an oxygen concentration controller described below, is supplied. Then, as shown in FIG. 4(b), hydrocarbons (HC) in the exhaust gas is partially-oxidized in the NOx purifying catalyst layer by the small amount of oxygen, and hydrogen ($H_2$) and carbon monoxide (CO) are generated. By the generated hydrogen and carbon monoxide, nitrogen dioxide ($NO_2$) adsorbed to the NOx trapping agent layer is reduced and results in nitrogen.

Thus, in the exhaust gas purifying system in the present invention, the small amount of oxygen is purposely introduced to the NOx purifying catalyst under rich condition where the amount of oxygen in the exhaust gas generally decreases. As a result, the partially-oxidized reaction of hydrocarbons is enhanced and nitrogen oxide is reduced sufficiently.

Furthermore, it is preferable in the exhaust gas purifying system in the present invention that the HC trapping agent is provided in addition to the NOx purifying catalyst and the NOx trapping agent. When the exhaust gas purifying catalyst is at a low temperature, hydrocarbons exhausted from the engine are adsorbed to the HC trapping agent. Then, when it makes the catalyst temperature high and the system is shifted to rich condition, hydrogen and carbon monoxide are generated from the hydrocarbons. Therefore, it is possible to remove not only nitrogen oxide but also hydrocarbons in the exhaust gas with high efficiency. The exhaust gas purifying catalyst shown in FIG. 4 have a three-layered structure including the HC trapping agent, the NOx trapping agent and the NOx purifying catalyst, each of which is formed as an independent layer respectively, for reasons of expediency. However, the structures shown in FIGS. 1-3 may have similar effects as well.

While, it is not necessary that hydrocarbons used to reduce nitrogen oxide released from NOx trapping agent by the above-mentioned mechanism are only ones released from HC trapping agent. Hydrocarbons in the exhaust gas entering the exhaust gas purifying catalyst when nitrogen oxide releases from NOx trapping agent may be used to reduce nitrogen oxide. By providing the HC trapping agent, however, hydrocarbons in the exhaust gas and trapped in the HC trapping agent may be transformed into hydrogen and carbon monoxide with high efficiency. It makes the nitrogen oxide reduction enhanced and emissions of hydrocarbons controlled. Furthermore, it makes fuel inefficiency improved and catalysts more compact, which results in decreasing carbon dioxide and utilizing noble metal resources effectively.

Next, the following is an explanation of the oxygen concentration controller for supplying a small amount of oxygen under rich condition. The oxygen concentration controller may be, but not limited to, a controller such as a combination of an exhaust gas recirculation valve and an intake throttle valve shown in FIG. 5, as long as it is possible to have a function to control the oxygen concentration in the exhaust gas, especially the oxygen concentration in the exhaust gas at an inlet of the NOx purifying catalyst.

FIG. 5 shows an embodiment of the exhaust gas purifying system. In the system of FIG. 5, an intake air from an intake passage 19 is compressed by a turbocharger 23 and cooled by an intercooler 29. After passing through an intake throttle valve 24, the air flows into a combustion chamber of each cylinder of the engine 10 through an intake manifold. While, a fuel is sent to a common rail 10a, highly pressurized by a high-pressure fuel pump, and directly injected into the combustion chamber from a fuel injection valve of each cylinder. The incoming air into the combustion chamber and the injected fuel are then combusted by a compression ignition. The exhaust from the engine 10 is discharged into an exhaust passage 16 through an exhaust manifold.

Then, by an exhaust gas recirculation system 20, a part of the gas exhausted from the engine 10 is mixed into the intake side of the engine 10 by the exhaust gas recirculation valve 21 and an exhaust gas recirculation pipe 22. The exhaust gas circulated to the intake side of the engine 10 by the exhaust gas recirculation system 20 is mixed with the intake air and introduced again into the combustion chamber of each cylinder of the engine 10.

In the system of the present invention, an aperture of the exhaust gas recirculation valve 21 and the intake throttle valve 24 are controlled by a central processing unit (CPU) so that the oxygen concentration in the exhaust gas can be controlled within a range described below.

Also, it is an effective means that the exhaust gas recirculation valve 21 and the intake throttle valve 24 are operated based on a predictive control disclosed in Japanese Patent No. 3918402. In addition, a fuel injection interval is controlled when an excess air ratio (lambda) is 1 or less so as to enhance oxygen controllability.

It is also an applicable means that secondary air is introduced into the inlet of the NOx purifying catalyst while measuring the oxygen concentration in the exhaust gas at the inlet of the NOx purifying catalyst. It is not shown in the figure in particular, however, an air inlet valve is provided on the exhaust passage 16 in an upstream side of a catalytic converter 15 at least including the NOx purifying catalyst. Then, the amount of air (oxygen) introduced into the catalytic converter 15 may be controlled within a range described below by controlling an aperture of the air inlet valve. The oxygen concentration controller may be used with a combination of the above-mentioned means.

Next, the following is an explanation of the performance of the exhaust gas purifying system. In this exhaust gas purifying system, nitrogen oxide in the exhaust gas is adsorbed to the NOx trapping agent when the excess air ratio (lambda) in the exhaust gas is more than 1, i.e. at lean condition. In the case of providing the HC trapping agent, hydrocarbons are adsorbed to the HC trapping agent when the exhaust gas temperature is low.

While, when the excess air ratio (lambda) in the exhaust gas is 1 or less, i.e. at rich condition, the oxygen concentration in the exhaust gas introduced into the NOx purifying catalyst is controlled ranging from 0.8 to 1.5% by volume. It leads to a partial oxidizing reaction of hydrocarbons in the exhaust gas, and as a result, nitrogen oxide is reduced by produced hydrogen and carbon monoxide. It is also possible that hydrocarbons adsorbed to the HC trapping agent are released so that hydrogen and carbon monoxide are produced by the partial oxidizing reaction. The excess air ratio (lambda) is expressed as an actual air fuel ratio, which is determined by the amount of intake air and fuel gas, divided by 14.7 of a theoretical (stoichiometric) air fuel ratio. The excess air ratio describes the supply air fuel ratio in relation to the theoretical air fuel ratio.

In fact, if the oxygen concentration is less than 0.8% by volume, production of hydrogen and carbon monoxide is insufficient, which means hydrogen and carbon monoxide are not produced from hydrocarbons enough. While, if the oxygen concentration is more than 1.5% by volume, the oxidizing reaction of reductants becomes dominant. As a result, hydrogen and carbon monoxide as effective reductants are consumed by the oxidizing reaction. Furthermore, it may be caused that the NOx purifying catalyst is poisoned by oxygen, an activation of the partial oxidizing reaction becomes insufficiently, and nitrogen oxide is not reduced.

In the present invention, it is preferable that the excess air ratio (lambda) is 1 or less, and the range of the oxygen concentration is between 1.1 and 1.4% by volume with respect to the reduction of nitrogen oxide and the transformation of hydrocarbons. It is more preferable that the excess air ratio (lambda) is 1 or less, and the range of the oxygen concentration is between 1.1 and 1.2% by volume.

In the present invention, it is also preferable that the excess air ratio (lambda) is 0.89 or less, and the range of the oxygen concentration is between 1.1 and 1.4% by volume. It is more preferable that the excess air ratio (lambda) is 0.89 or less, and the range of the oxygen concentration is between 1.1 and 1.2% by volume.

Moreover, in the present invention, it is especially preferable that the excess air ratio (lambda) is between 0.75 and 0.83, and the range of the oxygen concentration is between 0.8 and 1.5% by volume. Furthermore, it is preferable that the excess air ratio (lambda) is between 0.75 and 0.83, and the range of the oxygen concentration is between 1.1 and 1.4% by volume, more preferably between 1.1 and 1.2% by volume. The above-mentioned range enables the amount of hydrogen production to be increased, and nitrogen oxide to be reduced with high efficiency.

More specifically, nitrogen oxide being trapped in the NOx trapping agent at the excess air ratio (lambda) of more than 1 is released from the NOx trapping agent by shifted to the excess air ratio (lambda) of 1 or less. While, hydrocarbons being trapped in the HC trapping agent is released from the HC trapping agent by heated to the release temperature of hydrocarbons, typically between 200 and 250 degrees Celsius or more.

Then, released hydrocarbons are selectively or preferentially partially-oxidized so as to produce hydrogen and carbon monoxide as reductants by the NOx purifying catalyst activating under a high temperature at the excess air ratio (lambda) of 1 or less and with the oxygen concentration of the above mentioned ranges. Accordingly, nitrogen oxide released from the NOx trapping agent is effectively reduced by produced hydrogen and carbon monoxide.

In the exhaust gas purifying system of the present invention, however, the HC trapping agent is not essential. Even if the HC trapping agent is not provided, the exhaust gas contains a certain amount of hydrocarbons regardless of the excess air ratio. Thus, hydrogen and carbon monoxide are produced from such hydrocarbons, and nitrogen oxide released from the NOx trapping agent is reduced.

Nevertheless, in the exhaust gas purifying system of the present invention, it is preferable that the HC trapping agent is provided with the NOx trapping agent and the NOx purifying catalyst, and the release of hydrocarbons from the HC trapping agent and the release of nitrogen oxide from the NOx trapping agent are mutually synchronized. Then, hydrocarbons are transformed into hydrogen and carbon monoxide so that released nitrogen oxide is reduced under a predetermined low-oxygen atmosphere with the NOx purifying catalyst. Thus, in the above-mentioned exhaust gas purifying system, it is useful that hydrocarbons and nitrogen oxide to be purified are reacted each other and able to be purified at the same time respectively. Moreover, hydrocarbons are transformed into hydrogen and carbon monoxide so as to be high-efficient and effective reductants. Therefore, it makes the reduction of nitrogen oxide improve remarkably and the discharge possibility of unreacted hydrocarbons into the air reduce.

As described above, it is preferable that the release of hydrocarbons and the release of nitrogen oxide are mutually synchronized in the present system. Generally, the release of hydrocarbons does not depend on the excess air ratio in the exhaust gas. The release of hydrocarbons is made by heating the HC trapping agent to the release temperature of hydrocarbons or higher. It is, therefore, preferable to provide a temperature controller around the HC trapping agent in order to control the timing of the release of hydrocarbons. The temperature controller may include, but not limited to, temperature sensors and various heaters provided adjacent to the HC trapping agent, and devices including the central processing unit (CPU) as needed, as long as it is possible to heat the HC trapping agent to the above-mentioned release temperature or more with the intended timing.

Figure 5A:
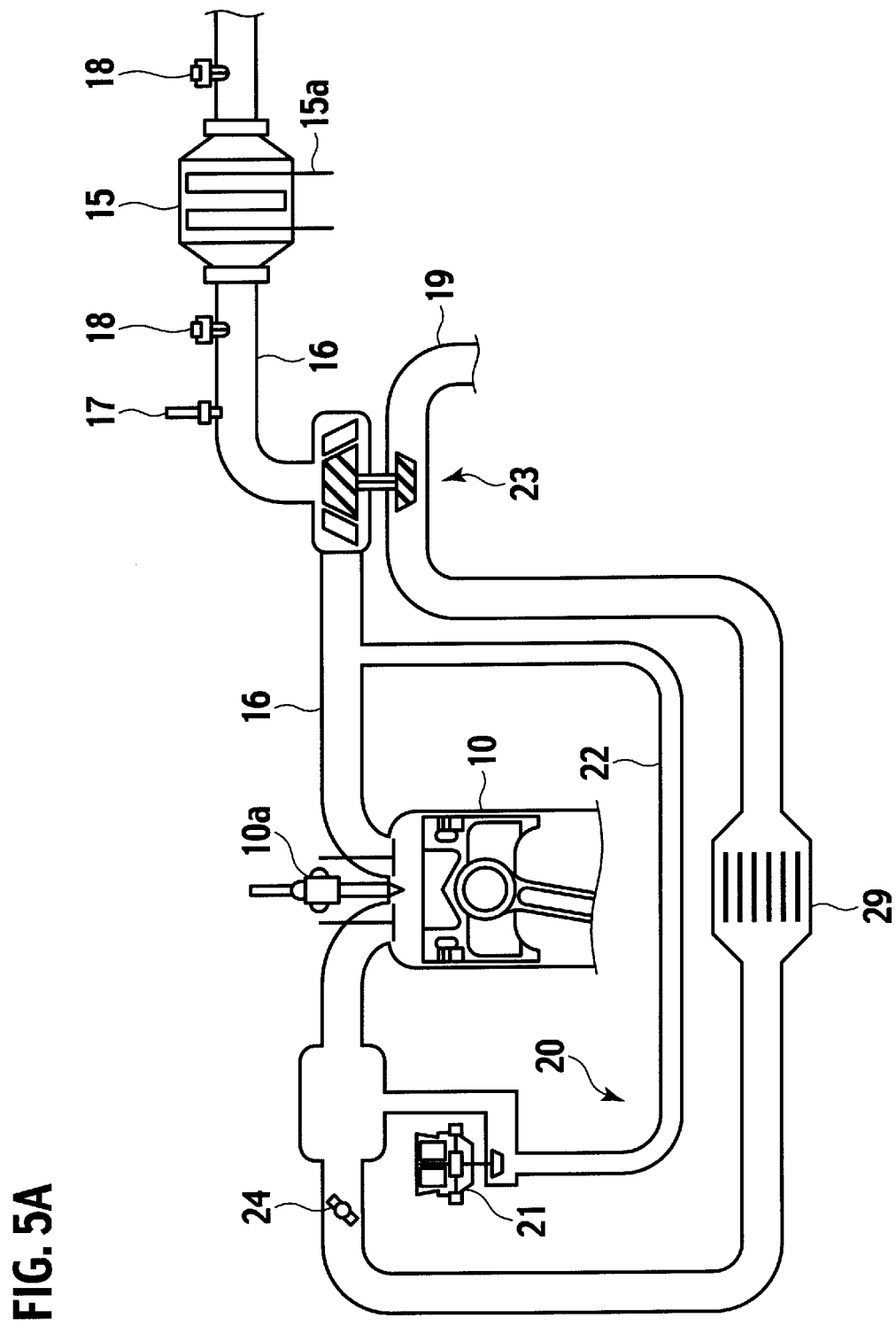
FIG. 5A is a schematic view showing an example of an internal combustion engine with an exhaust gas purifying system of the present invention.

FIG. 5A shows an example of the exhaust gas purifying system including the temperature controller. The system in FIG. 5A includes the catalytic converter 15 providing the HC trapping agent, the NOx trapping agent and the NOx purifying catalyst, and a heater 15a adjacent to the catalytic converter 15. The heater 15a is controlled by CPU not shown in the figure. The CPU measures the temperature of the catalytic converter 15 by the temperature sensor, and also measures the excess air ratio of the exhaust gas by an A/F sensor 17. If the excess air ratio is 1 or less and the temperature of the catalytic converter 15 is less than the release temperature of hydrocarbons, the CPU applies current to the heater 15a, and heats the catalytic converter 15 to release hydrocarbons. Thus, it is possible to synchronize the release of nitrogen oxide from the NOx trapping agent and the release of hydrocarbons from the HC trapping agent with the excess air ratio of 1 or less. In addition, the temperature sensor can use a thermocouple to directly measure the temperature of the catalytic converter 15. Also, it is possible to measure the incoming gas temperature and outgoing gas temperature of the catalytic converter 15 by the temperature sensors 18 provided on both sides of the catalytic converter 15 so as to estimate the temperature of the catalytic converter 15. The A/F sensor is used as the sensor 17 in FIG. 5A, however, an oxygen sensor measuring the oxygen concentration may be used instead of the A/F sensor, which can function as well.

Also, it is effective as well that the HC trap catalyst 12, which only the HC trapping agent is supported on the honeycomb monolithic substrate 1 as shown in FIG. 3, can use the above-mentioned heaters and temperature sensors.

Figure 5B:
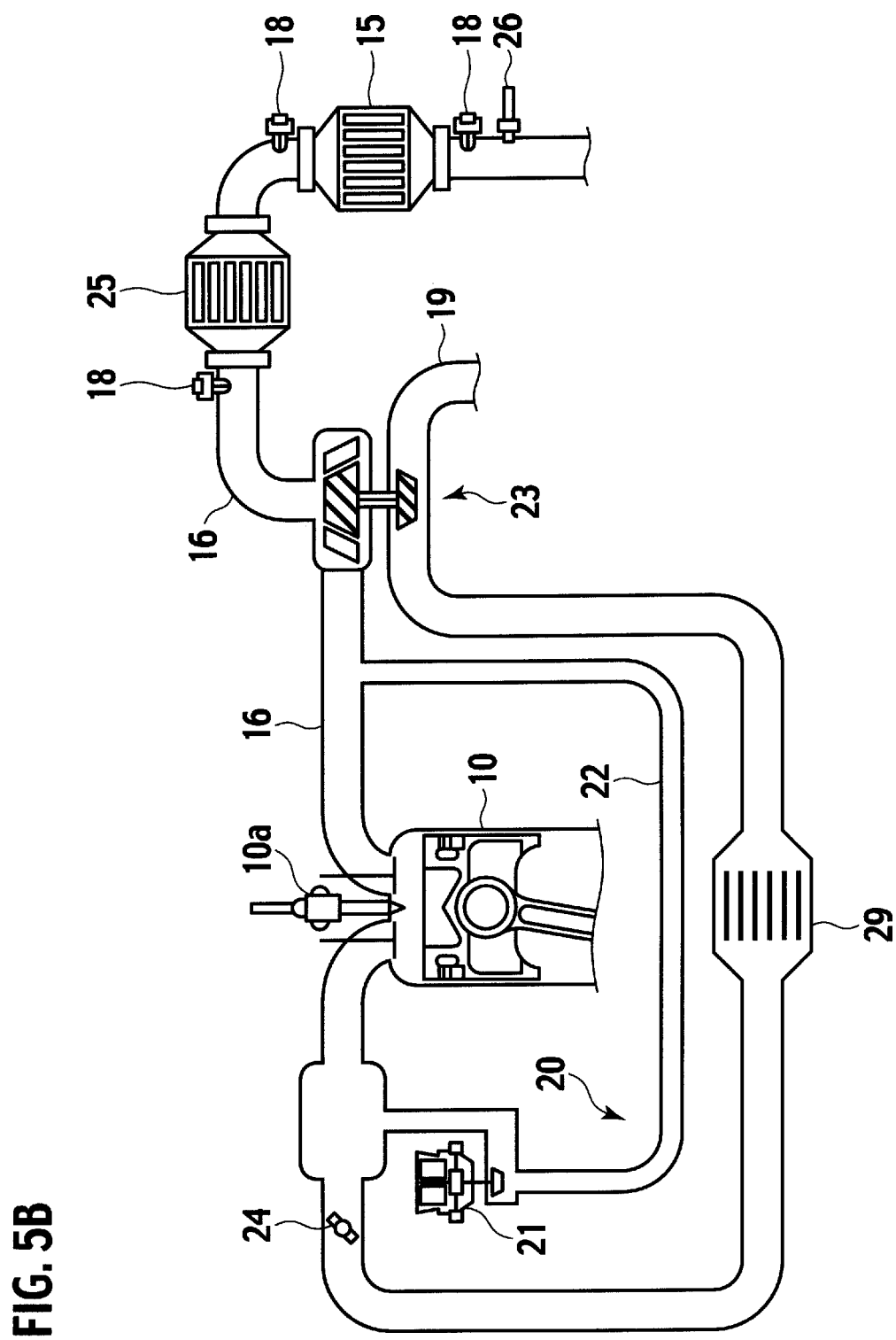
FIG. 5B is a schematic view showing another example of an internal combustion engine with an exhaust gas purifying system of the present invention.

FIG. 5B shows another example of the exhaust gas purifying system including the temperature controller. The system in FIG. 5B includes an oxidation catalyst 25 and a lambda sensor 26 instead of the heater 15 used in the system of FIG. 5A. The oxidation catalyst 25 functions to oxidize hydrocarbons and carbon monoxide in the exhaust gas, and the lambda sensor 26 functions to measure the excess air ratio in the exhaust gas.

The following is an explanation of a method for controlling the HC trapping agent temperature by the system of FIG. 5B. First, the incoming gas temperature and outgoing gas temperature of the oxidation catalyst 25 are measured by the temperature sensors 18 provided on both upstream and downstream sides of the oxidation catalyst 25. Second, the temperature of the oxidation catalyst 25 is estimated based on the incoming gas temperature and outgoing gas temperature. If the temperature of the oxidation catalyst 25 is below a predetermined value, the catalyst is determined not to reach its activation temperature. Then, the operation is started to increase the exhaust gas temperature, i.e. to make the condition a little richer. Under the operation at rich condition, the oxidation catalyst 25 oxidizes hydrocarbons and carbon monoxide in the exhaust gas, and the exhaust gas temperature is increased. When the exhaust gas heated by the oxidation catalyst 25 flows into catalytic converter 15 provided with the HC trapping agent, the temperature of the HC trapping agent can be increased. Thus, it is possible to increase the temperature of the HC trapping agent by the operation at rich condition via the lambda sensor 26, and to lower the temperature of the HC trapping agent by the operation at lean condition via the lambda sensor 26, so that the temperature of the HC trapping agent is controlled.

As described above, it is preferable in the present invention that hydrocarbons and nitrogen oxide are once trapped in the HC trapping agent and the NOx trapping agent. According to the present invention, when each adsorbed amount of hydrocarbons and nitrogen oxide reaches a certain level respectively, the excess air ratio (lambda) and the oxygen concentration at the inlet of the catalyst may be controlled within the range of the above-mentioned values.

In fact, the emission amounts of nitrogen oxide and hydrocarbons have been improved regarding recent internal combustion engines with high fuel efficiency. Therefore, it is rational that nitrogen oxide and hydrocarbons with low concentration are purified at the time each adsorbed amount reaches a certain value while adsorbing nitrogen oxide and hydrocarbons onto the catalyst. Thus, the exhaust gas purifying system of the present invention can includes means for estimating or measuring a HC adsorbed amount of the HC trapping agent (HC amount estimator). By the HC amount estimator, the excess air ratio (lambda) of the incoming exhaust gas is controlled to be 1 or less, and the oxygen concentration is also controlled as mentioned above at the time the adsorbed amount exceeds the predetermined value. This enables hydrogen and carbon monoxide to be produced taking account of not only hydrocarbons released from the HC trapping agent but also hydrocarbons in the incoming exhaust gas. Accordingly, it is possible to reduce nitrogen oxide released from the NOx trapping agent.

In addition to the HC amount estimator, it is possible to provide means for estimating or measuring a NOx adsorbed amount of the NOx trapping agent (NOx amount estimator). By the NOx amount estimator, the excess air ratio (lambda) of the incoming exhaust gas is controlled to be 1 or less so as to release nitrogen oxide from the NOx trapping agent at the time the adsorbed amount exceeds the predetermined value.

With a combination of the HC amount estimator and the NOx amount estimator, it is possible to make the balance of the purification amount between hydrocarbons and nitrogen oxide correspond each other, which is extremely efficient. Moreover, it is also possible that unpurified hydrocarbons and nitrogen oxide are hardly discharged.

The HC amount estimator and the NOx amount estimator may be, but not limited to, control systems providing CPU having characteristics maps associating with parameters of a trapping agent type, a trapping agent amount, an engine revolution speed, an accelerator stroke, an engine load, an exhaust gas temperature, an exhaust gas amount or the like, as long as it is possible to estimate or measure the HC trapping amount and NOx trapping amount.

The following is an explanation of a specific example of the HC amount estimator and the NOx amount estimator.

Figure 6:
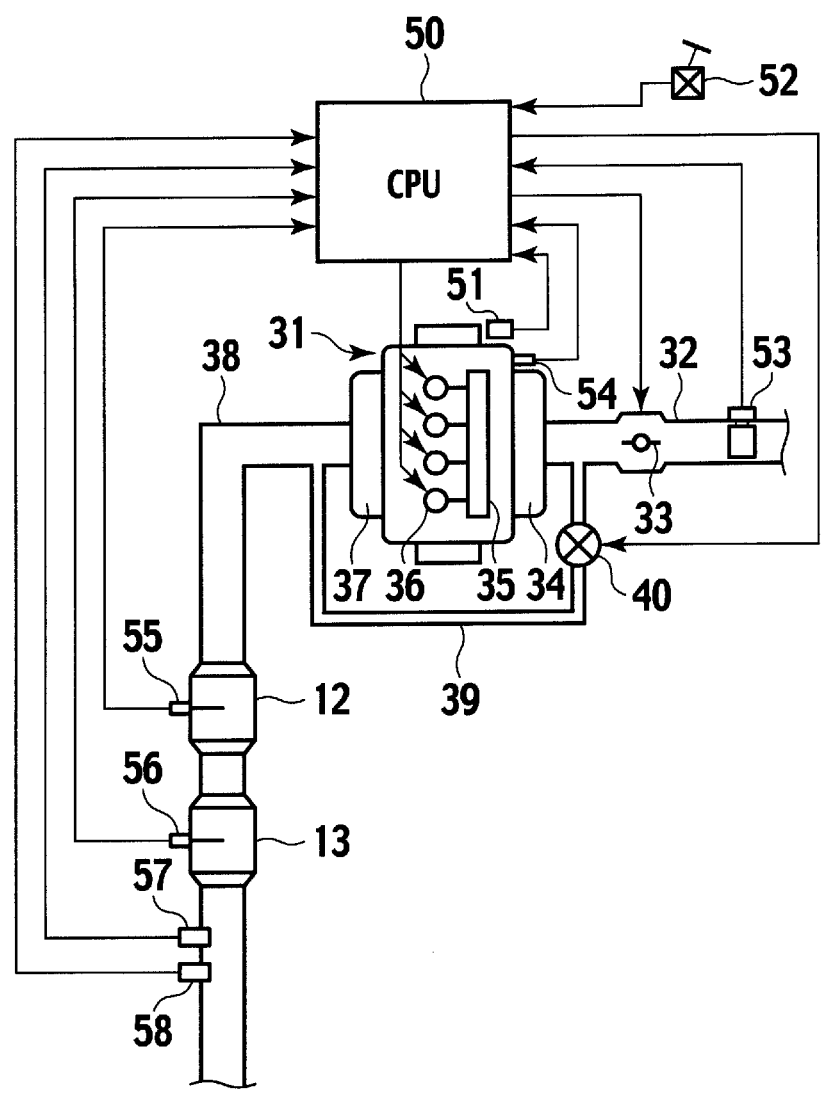
FIG. 6 is a schematic view showing an example of a HC amount estimator and a NOx amount estimator.

FIG. 6 shows an exhaust gas purifying system including the HC amount estimator and the NOx amount estimator.

As well as the systems of FIGS. 5A and 5B, an intake air from an intake passage 32 passes through an intake throttle valve 33 and an intake manifold 34, and flows into a combustion chamber of each cylinder of the engine 31. While, a fuel is sent to a common rail 35, highly pressurized by a high-pressure fuel pump, and directly injected into the combustion chamber from a fuel injection valve 36 of each cylinder. The incoming air into the combustion chamber and the injected fuel are then combusted by a compression ignition. An exhaust gas from the engine 31 is discharged into an exhaust passage 38 through an exhaust manifold 37. Then, a part of gas is returned to an intake side of the engine as an EGR gas by an exhaust gas recirculation pipe 39 through an exhaust gas recirculation valve 40.

In addition, the NOx trap-purifying catalyst 13 is provided on the exhaust passage 38. Moreover, the HC trap catalyst 12 is provide on an upstream side of the NOx trap-purifying catalyst 13.

In order to control the engine 31, signals are input to a CPU 50 from an engine revolution sensor 51 for detecting an engine revolution speed Ne, an accelerator stroke sensor 52 for detecting an accelerator stroke, an air flow meter 53 for detecting an intake air flow rate Qa, a water temperature sensor 54 for detecting an engine coolant temperature Tw or the like. The HC trap catalyst 12 and the NOx trap-purifying catalyst 13 are provided with catalyst substrate temperature sensors (thermocouple) 55, 56 to detect temperatures $T_{HC}$ and $T_{NOx}$ of these catalyst substrates. These signals are also input to the CPU 50.

Moreover, a NOx sensor 57 and a HC sensor 58 to detect each concentration of nitrogen oxide and hydrocarbons in the exhaust are provided downstream of the HC trap catalyst 12 and the NOx trap-purifying catalyst 13 (catalyst outlet side) in the exhaust passage 38. These signals are also input to the CPU 50. Then, it is possible to detect the NOx amount and HC amount at the catalyst outlet by each output of the NOx sensor 57 and the HC sensor 58, and an exhaust flow rate (replaced by the intake air flow rate Qa).

The CPU 50 outputs signals to control a fuel injection quantity and injection timing into the fuel injection valve 36, to direct an aperture of the intake throttle valve 33, and to direct an aperture of the exhaust gas recirculation valve 40, based on the input signals.

Figure 7:
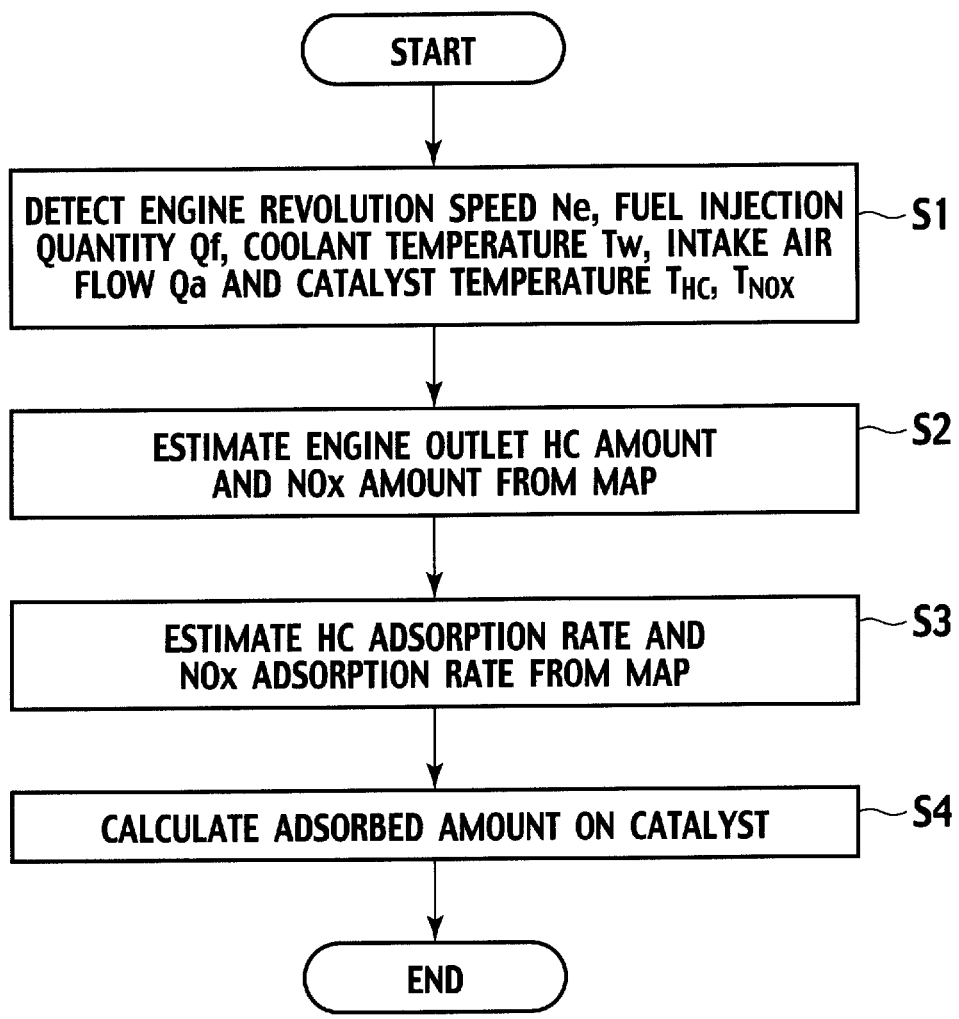
FIG. 7 is a flowchart showing to estimate an adsorbed amount of hydrocarbons and nitrogen oxide by a HC amount estimator and a NOx amount estimator.

Then, the adsorbed amount of each catalyst is estimated and calculated at the CPU 50 to recognize the adsorbed amount of hydrocarbons and nitrogen oxide to the HC trap catalyst 12 and the NOx trap-purifying catalyst 13 according to a control flow in FIG. 7.

FIG. 7 is a main flow of adsorbed amount estimation. As a step S1, an engine revolution speed Ne, a fuel injection quantity Qf, a coolant temperature Tw, an intake air flow rate Qa and catalyst temperatures $T_{HC}$, $T_{NOx}$ are detected. Also, the fuel injection quantity Qf is calculated by the engine revolution speed Ne and the accelerator stroke APO with reference to the map, and the calculated value is read into the CPU 50.

Figure 8:
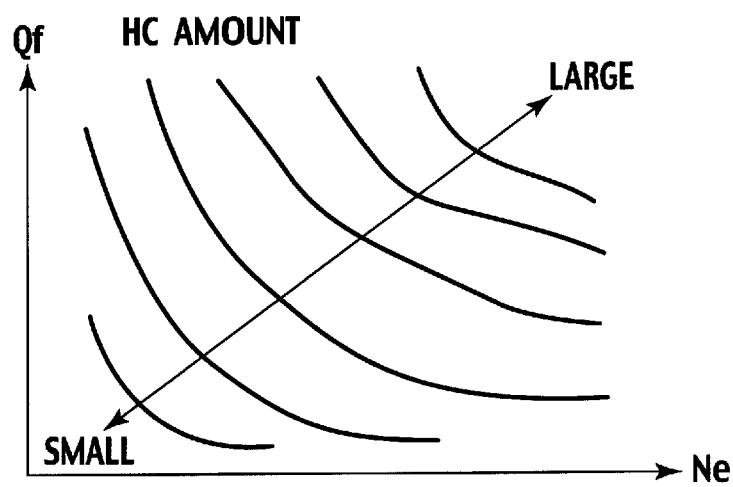
FIG. 8 is a view showing a map of an amount of hydrocarbons at an outlet of an engine.
Figure 9:
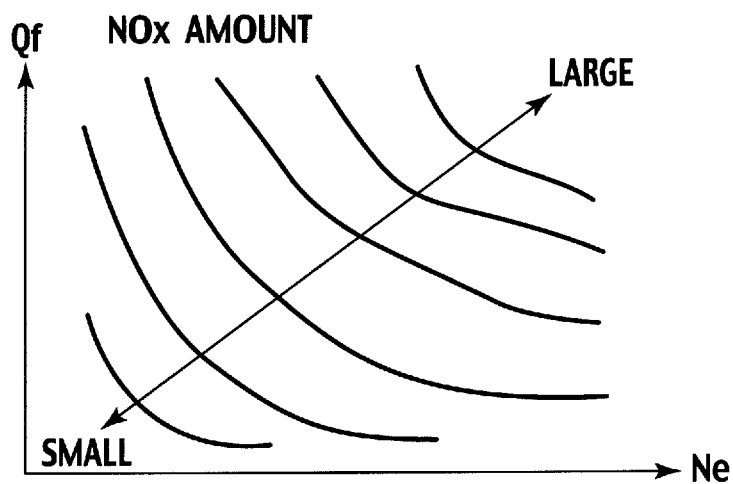
FIG. 9 is a view showing a map of an amount of nitrogen oxide at an outlet of an engine.

As a step S2, the HC amount at an outlet of the engine is estimated based on the engine revolution speed Ne and the fuel injection quantity Qf with reference to the map shown in FIG. 8. Also, the NOx amount at the outlet of the engine is estimated based on the engine revolution speed Ne and the fuel injection quantity Qf with reference to the map shown in FIG. 9. At this point, it is preferable to adjust the estimate values of the HC amount and the NOx amount at the outlet of the engine according to changes of the coolant temperature Tw because the coolant temperature Tw changes the HC amount and the NOx amount. While, FIGS. 8 and 9 are the maps to be memorized the HC amount and the NOx amount at the outlet of the engine, which are evaluated prospectively changing the engine revolution speed Ne and the fuel injection quantity Qf.

Figure 10:
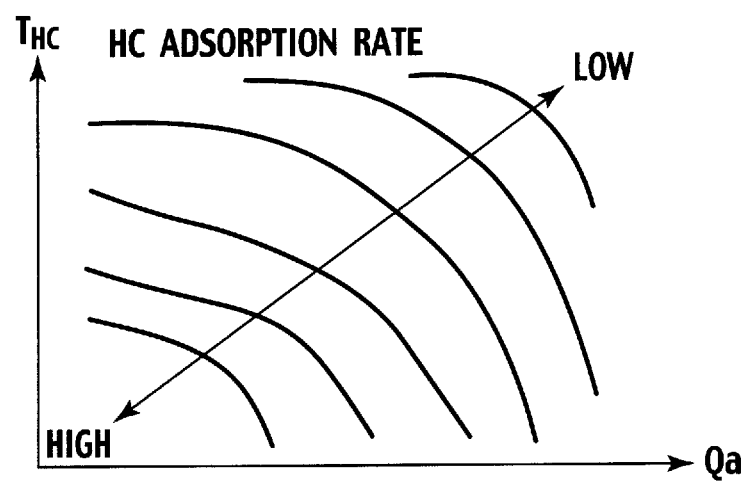
FIG. 10 is a view showing a map of an adsorption rate of hydrocarbons of a HC trapping agent.
Figure 11:
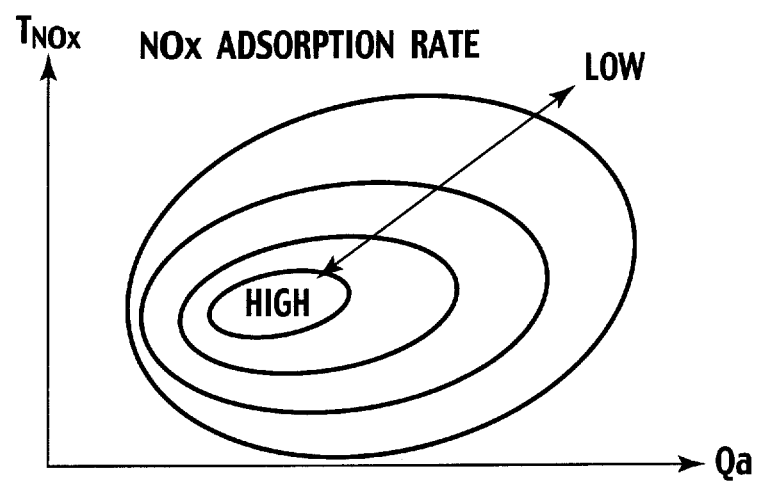
FIG. 11 is a view showing a map of an adsorption rate of nitrogen oxide of a NOx trapping agent.

As a step S3, a HC adsorption rate of the HC trap catalyst is estimated based on a substrate temperature of the HC trap catalyst and the intake air flow rate Qa with reference to the map shown in FIG. 10. Also, a NOx adsorption rate of the NOx trap-purifying catalyst is estimated based on a substrate temperature of the NOx trap-purifying catalyst and the intake air flow rate Qa with reference to the map shown in FIG. 11. While, FIGS. 10 and 11 are the maps to be memorized the HC adsorption rate and the NOx adsorption rate, which are evaluated prospectively changing the catalyst substrate temperature and the intake air flow rate. Besides, it is possible to evaluate the HC adsorption rate by equation 1 (Math 1) below according to the amount of hydrocarbons at an inlet of the HC trap catalyst (catalyst inlet HC amount) and the amount of hydrocarbons at an outlet of the catalyst (catalyst outlet HC amount). Also, it is possible to evaluate the NOx adsorption rate by equation 2 (Math 2) below according to the amount of nitrogen oxide at an inlet of the NOx trap-purifying catalyst (catalyst inlet NOx amount) and the amount of nitrogen oxide at an outlet of the catalyst (catalyst outlet NOx amount).

$$HC \text{ adsorption rate (\%)} = \frac{(\text{catalyst inlet } HC \text{ amount}) - (\text{catalyst outlet } HC \text{ amount})}{(\text{catalyst inlet } HC \text{ amount})} \times 100 \quad [\text{Math. 1}]$$

$$NOx \text{ adsorption rate (\%)} = \frac{(\text{catalyst inlet } NOx \text{ amount}) - (\text{catalyst outlet } NOx \text{ amount})}{(\text{catalyst inlet } NOx \text{ amount})} \times 100 \quad [\text{Math. 2}]$$

Then, as a step S4, the HC adsorbed amount in the HC trap catalyst 12 is evaluated based on the HC amount at the outlet of the engine 31 and the HC adsorption rate of the HC trap catalyst 12 estimated by the operating condition. Also, the NOx adsorbed amount in the NOx trap-purifying catalyst 13 is evaluated based on the NOx amount at the outlet of the engine 31 and the NOx adsorption rate of the NOx trap-purifying catalyst 13 estimated by the operating condition.

The present invention will be illustrated further in detail by the following examples, however, the scope of the invention is not limited to these examples.

By the following method, a catalyst powder was prepared to use for the exhaust gas purifying catalyst in Examples 1 and 2.

(Preparation of Catalyst Powder)

First, alumina was added in a mixture of a cerium acetate $(Ce(CH_3CO_2)_3)$ solution and a barium acetate $(Ba(CH_3CO_2)_2)$ solution. The alumina mixed solution was stirring for 1 hour at room temperature, and dried for twenty-four hours at 120 degrees Celsius to eliminate water, and the mixture was calcinated at 600 degrees Celsius for 1 hour. Then, the obtained calcinated powder was impregnated with a tetraammineplatinum hydroxide solution (pH=10.5) of a platinum concentration of 2%. After drying for twenty-four hours at 120 degrees Celsius and eliminating water, the mixture was calcinated at 450 degrees Celsius for 1 hour. Thus, a catalyst powder CP1 was obtained with the platinum support concentration of 1%, the barium support concentration of 8% in terms of barium oxide (BaO), and the cerium support concentration of 20% in terms of cerium oxide $(CeO_2)$.

Next, alumina was added in a zirconium acetate (Zr $(CH_3CO_2)_4$) solution and stirring for 1 hour at room temperature. After drying the alumina mixed solution for twenty-four hours at 120 degrees Celsius and eliminating water, the mixture was calcinated at 900 degrees Celsius for 1 hour. Then, the obtained calcinated powder was impregnated with a rhodium nitrate $(Rh(NO_3)_3)$ solution with a rhodium concentration of 6%. After drying for twenty-four hours at 120 degrees Celsius and eliminating water, the mixture was calcinated at 450 degrees Celsius for 1 hour. Thus, a catalyst powder CP2 was obtained with the rhodium support concentration of 2%, and the zirconium support concentration of 3%.

Next, alumina was added in a mixture of a cerium acetate solution and a barium acetate solution. The alumina mixed solution was stirring for 1 hour at room temperature, and dried for twenty-four hours at 120 degrees Celsius. After eliminating water, the mixture was calcinated at 600 degrees Celsius for 1 hour. Then, the obtained calcinated powder was impregnated with a tetraammineplatinum hydroxide solution (pH=10.5) of a platinum concentration of 2%. After drying for twenty-four hours at 120 degrees Celsius and eliminating water, the solution was calcinated at 450 degrees Celsius for 1 hour. Thus, a catalyst powder CP3 was obtained with the platinum support concentration of 3.5%, the barium support concentration of 8% in terms of barium oxide (BaO), and the cerium support concentration of 20% in terms of cerium oxide $(CeO_2)$. Note that all the processes of drying and calcination in the examples of the description were done in air.

(Preparation of Exhaust Gas Purifying Catalyst of Example 1)

The exhaust gas purifying catalyst of Example 1 was prepared by the following method.

326 g of the catalyst powder CP1, 186 g of the catalyst powder CP2, 268 g of the catalyst powder CP3, 35 g of alumina, 90 g of alumina sol and 900 g of water were charged into a porcelain ball mill, and wet-milled until reduced to 3 micrometer or less in average particle diameter so as to obtain a catalyst slurry CS1.

Next, a cordierite honeycomb monolith substrate (1.2 L, 400 cpsi) was coated with the catalyst slurry CS1. After removing the extra slurry coated on the monolith substrate by compressed airflow, and drying at 130 degrees Celsius, the monolith substrate was calcinated at 450 degrees Celsius for 1 hour. Thus, the NOx trap-purifying catalyst of Example 1, of which a catalyst layer with a coating amount of 320 g/L was formed on the monolith substrate, was obtained. The aforementioned catalyst is the exhaust gas purifying catalyst with a single catalyst layer as shown in FIG. 2(*c*), however, the HC trapping agent is not contained in the catalyst of Example 1.

(Preparation of Exhaust Gas Purifying Catalyst of Example 2)

The exhaust gas purifying catalyst of Example 2 was prepared by the following method.

First, 720 g of proton type beta zeolite with a silica-alumina molar ratio of approximately 25, 180 g of silica sol and 900 g of water were charged into a porcelain ball mill, and wet-milled until reduced to 3.8 micrometer or less in average particle diameter so as to obtain a zeolite slurry Z1.

Next, 555 g of the catalyst powder CP1, 25 g of alumina, 230 g of beta zeolite, 90 g of alumina sol and 900 g of water were charged into a porcelain ball mill, and wet-milled until reduced to 3.2 micrometer or less in average particle diameter so as to obtain a catalyst slurry CS2.

Further, 317 g of the catalyst powder CP2, 454 g of the catalyst powder CP3, 38 g of alumina, 90 g of alumina sol and 900 g of water were charged into a porcelain ball mill, and wet-milled until reduced to 3 micrometer or less in average particle diameter so as to obtain a catalyst slurry CS3.

Then, the cordierite honeycomb monolith substrate (1.2 L, 400 cpsi) was coated with the above-mentioned zeolite slurry Z1. After removing the extra slurry coated on the monolith substrate by compressed airflow, and drying at 130 degrees Celsius, the substrate coated slurry was calcinated at 450 degrees Celsius for 1 hour. Thus, a zeolite layer (a first layer) with a coating amount of 80 g/L was formed on the monolith substrate.

Next, the zeolite layer was coated with the catalyst slurry CS2, and the extra slurry in the cell was removed by compressed airflow as well. After drying at 130 degrees Celsius, the substrate coated slurry was calcinated at 450 degrees Celsius for 1 hour, and a catalyst layer (a second layer) with a coating amount of 220 g/L was formed.

Furthermore, the second layer was coated with the catalyst slurry CS3, and the extra slurry in the cell was removed by compressed airflow as well. After drying at 130 degrees Celsius, the substrate coated slurry was calcinated at 450 degrees Celsius for 1 hour, and a catalyst layer (a third layer) with a coating weight of 100 g/L was formed. Thus, the HC trap-NOx trap-purifying catalyst of Example 2 was obtained. Note that in the catalyst of Example 2, the zeolite layer as the first layer corresponds to the HC trapping agent layer, the second layer corresponds to the HC trap-NOx trap-purifying catalyst layer, and the third layer corresponds to the NOx trap-purifying catalyst layer. Therefore, the catalyst of Example 2 is the similar constitution as the exhaust gas purifying catalyst of FIG. 2(a), however, the HC trapping agent is further contained in the coexistent layer 5.

(Performance Test 1)

Figure 12:
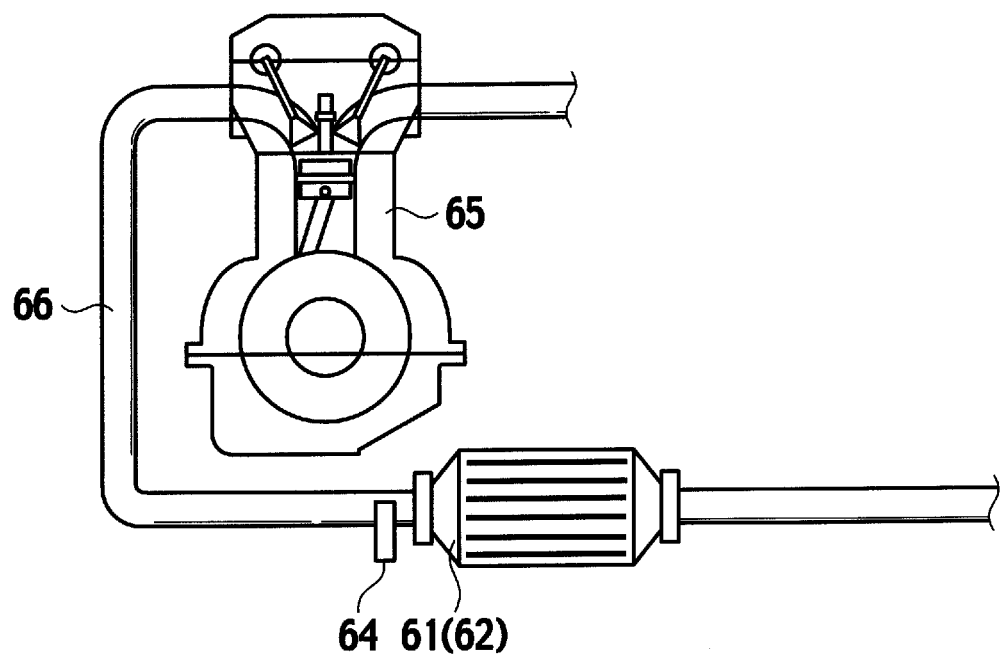
FIG. 12 is a schematic view showing an internal combustion engine and an exhaust gas purifying system to evaluate catalysts of embodiments.

First, as shown in FIG. 12, a NOx trap-purifying catalyst 61 by the process of Example 1 or a HC trap-NOx trap-purifying catalyst 62 by the process of Example 2 were provided in an exhaust passage 66 of a 2500 cc in-line four cylinder direct-injection diesel engine 65 made by NISSAN MOTOR CO., LTD. Note that, reference numeral 64 designates an oxygen sensor. Next, the following is an evaluation process of each catalyst 61 and catalyst 62. For the first process, it was repeated to operate the engine 65 at lean condition (A/F=30) for 40 seconds then at rich condition (A/F=11.7) for 4 seconds. In other words, it was repeated that nitrogen oxide was adsorbed to the catalyst under lean condition, and released from the catalyst under rich condition to reduce nitrogen oxide. Then, the exhaust gas purification rate within this lean-rich range was evaluated. The oxygen concentration at the rich spike was changed by the controlling method disclosed in Japanese Patent No. 3918402. The applied fuel was a commercial JIS No. 2 diesel fuel. The temperature at the inlet of the catalyst was set at 220 degrees Celsius.

Figure 13:
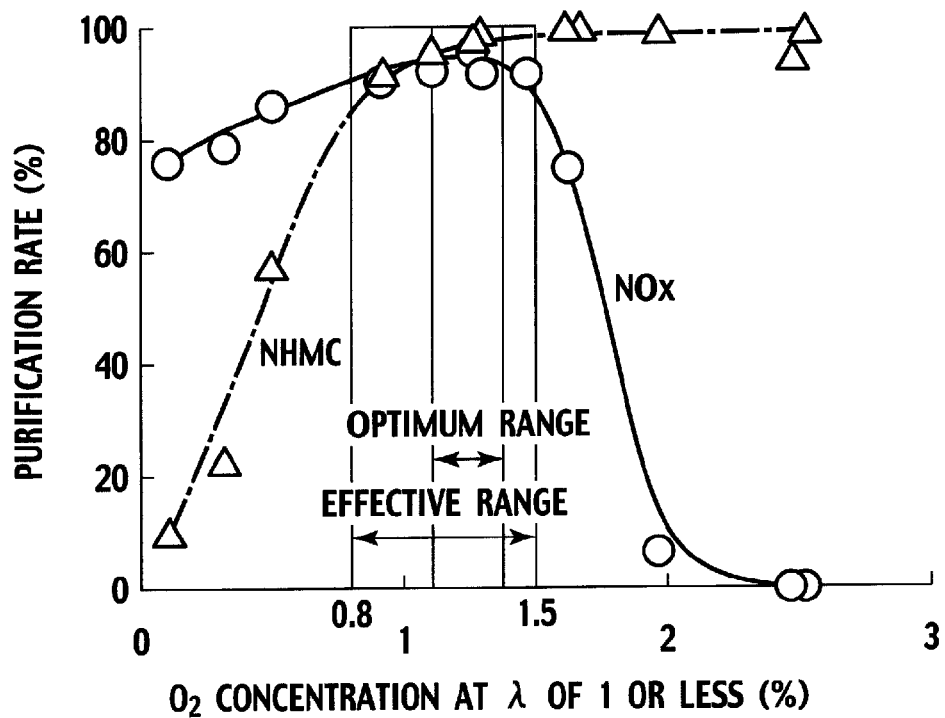
FIG. 13 is a graph showing a NOx purification rate and a HC purification rate against a NOx concentration of a catalyst of a first embodiment.
Figure 14:
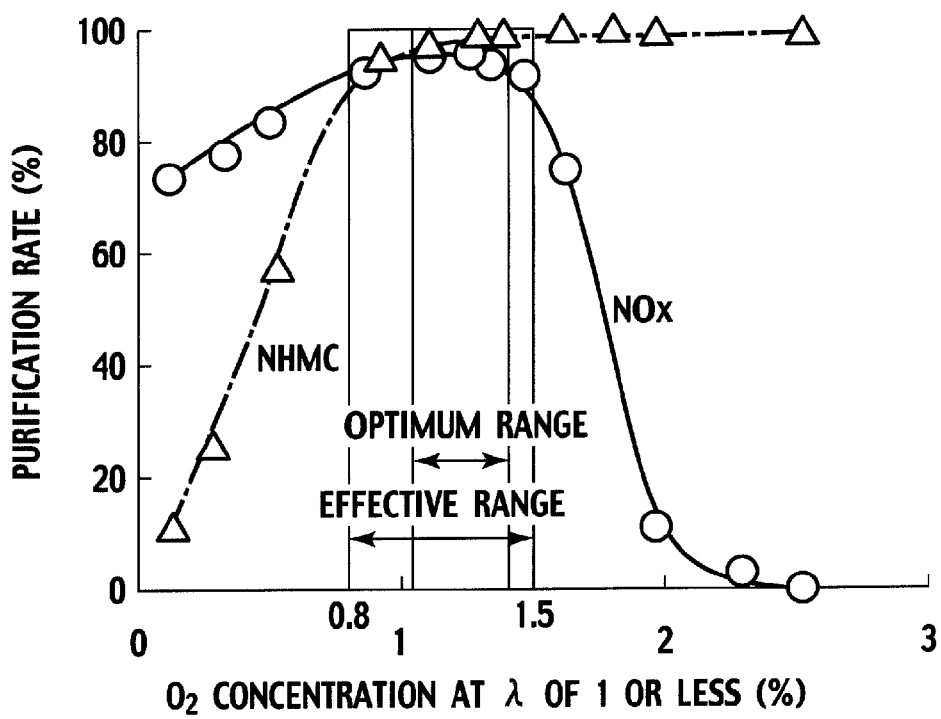
FIG. 14 is a graph showing a NOx purification rate and a HC purification rate against a NOx concentration of a catalyst of a second embodiment.

FIG. 13 shows the NOx purification rate and the HC purification rate with the oxygen concentration at the inlet of the catalyst changing from 0 to 2.5% regarding the catalyst 61 of Example 1. Also, FIG. 14 shows the NOx purification rate and the HC purification rate with the oxygen concentration at the inlet of the catalyst changing from 0 to 2.5% regarding the catalyst 62 of Example 2. As will be noted from FIGS. 13 and 14, both nitrogen oxide and hydrocarbons are efficiently purified with the oxygen concentration in the vicinity of 1%. Especially, it is apparent that the HC purification rate in the catalyst 62 of Example 2 is high, and the combination of the HC trapping agent and the NOx trapping agent is effective. Note that "NMHC" in the figures is an abbreviation of Non-Methane Hydrocarbon, which means hydrocarbons excluding methane.

(Performance Test 2)

First, as well as the HC trap-NOx trap-purifying catalyst 62 of Example 2, a catalyst with a plurality of layers was prepared changing the types of zeolite. Note that beta zeolite with the silica-alumina molar ratio of 25, 40 and 65 and MFI zeolite with the silica-alumina molar ratio of 28, 45 and 75 were applied.

Figure 15:
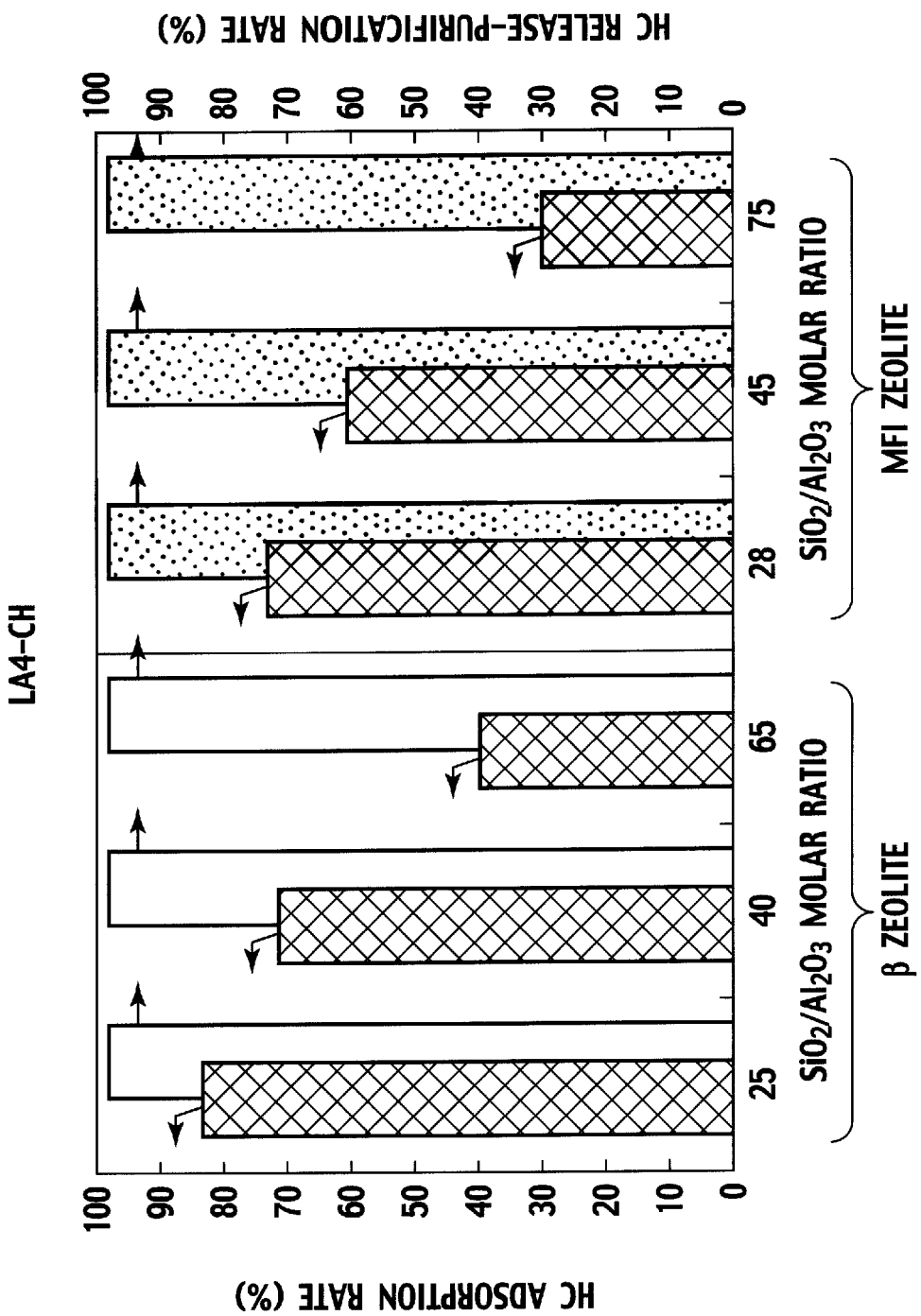
FIG. 15 is a graph showing a HC adsorption rate and a HC release-purification rate when types of zeolite are changed.

Next, the HC trap-NOx trap-purifying catalyst using each of the above-mentioned zeolite was provided in the exhaust passage 66 in FIG. 12. Then, LA-4 evaluation test was carried out to evaluate the HC adsorption rate and the HC release-purification rate with regard to cold HC of LA-4 A-Bag. FIG. 15 shows evaluation results of HC trap characteristics regarding the catalysts using each zeolite. Note that the HC adsorption rate and the HC release-purification rate were evaluated by using Math 3 and Math 4.

$$HC \text{ adsorption rate } (\%) = \frac{A - B}{A} \times 100 \qquad [\text{Math. 3}]$$

where:
A: Catalyst inlet HC amount during cold condition
B: Catalyst outlet HC amount during cold condition $$HC \text{ release-purification rate}(\%) = \frac{C - D}{C} \times 100 \qquad [\text{Math. 4}]$$

where:
C: Cold HC adsorbed amount
D: Unpurified cold HC amount

As shown in FIG. 15, it is apparent that the HC adsorption rate decreases if the silica-alumina molar ratio exceeds 60, and the catalysts using beta zeolite of approximately 25 to 40 and MFI zeolite give high performance. Also, each catalyst shows a high ability for release and purification respectively, which achieves the effect of over 97%.

The entire contents of a Japanese Patent Application No. P2007-201016 with a filing date of Aug. 1, 2007 and a Japanese Patent Application No. P2008-103684 with a filing date of Apr. 11, 2008 are herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

INDUSTRIAL APPLICABILITY

The present invention is characterized in that hydrogen and carbon monoxide are produced by incompletely combusted and partially oxidized hydrocarbons in the exhaust gas so that nitrogen oxide is reduced. Furthermore, it is preferable in the present invention that the release of hydrocarbons and the release of nitrogen oxide are mutually synchronized under a predetermined condition using the HC trapping agent and the NOx trapping agent. According to such an exhaust gas purifying system, it is capable of achieving compact catalyst systems and ensuring compatibility between reduction of nitrogen oxide and oxidation of hydrocarbons.

The invention claimed is:

1. An exhaust gas purifying system for an internal combustion engine, the system comprising: a NOx trapping agent which adsorbs nitrogen oxide when an excess air ratio of exhaust gas is more than 1, and releases nitrogen oxide when the excess air ratio is 1 or less; a NOx purifying catalyst which reduces nitrogen oxide to nitrogen; a HC trapping agent which adsorbs and releases hydrocarbons; and a CPU comprising instructions such that the CPU: controls oxygen concentration in the exhaust gas, controls the excess air ratio of the exhaust gas to be between 0.75 to 0.83 and when the excess air ratio of the exhaust gas is between 0.75 and 0.83, controls the oxygen concentration of the exhaust gas at an inlet of the NOx purifying catalyst between 1.1 and 1.2% by volume to enhance a partially-oxidized reaction of hydrocarbons in the exhaust gas, wherein a HC trapping agent layer containing the HC trapping agent is formed on a monolithic substrate, and a NOx trap-purifying catalyst layer containing the NOx trapping agent and the NOx purifying catalyst is formed on the HC trapping agent layer.

2. The exhaust gas purifying system according to claim 1, wherein the CPU further comprises instructions:
which estimates or measures an adsorbed amount of hydrocarbons in the HC trapping agent; and
which estimates or measures an adsorbed amount of nitrogen oxide in the NOx trapping agent.

3. The exhaust gas purifying system according to claim 1, wherein the CPU further comprises instructions which controls temperature of the HC trapping agent.

4. The exhaust gas purifying system according to claim 1, wherein the CPU further comprises instructions to control a heater to heat the HC trapping agent to a release temperature of hydrocarbons or higher to release hydrocarbons from the HC trapping agent.

5. The exhaust gas purifying system according to claim 1, further comprising:
an oxygen concentration controller comprising an exhaust gas recirculation valve and an intake throttle valve.

6. The exhaust gas purifying system according to claim 1, wherein the NOx purifying catalyst comprises at least one type of metal selected from the group consisting of platinum, rhodium, palladium, copper, iron, cobalt, manganese and zinc.

7. An exhaust gas purifying method for an internal combustion engine having an exhaust gas purifying system, the system comprising: a NOx trapping agent which adsorbs nitrogen oxide when an excess air ratio of exhaust gas is more than 1, and releases nitrogen oxide when the excess air ratio is 1 or less; a NOx purifying catalyst which reduces nitrogen oxide to nitrogen; a HC trapping agent which adsorbs and releases hydrocarbons; and a CPU including instructions such that the CPU controls oxygen concentration in the exhaust gas, wherein a HC trapping agent layer containing the HC trapping agent is formed on a monolithic substrate, and a NOx trap-purifying catalyst layer containing the NOx trapping agent and the NOx purifying catalyst is formed on the HC trapping agent layer, the method comprising: adsorbing nitrogen oxide to the NOx trapping agent when the excess air ratio of the exhaust gas is more than 1; controlling the excess air ratio of the exhaust gas to be between 0.75 and 0.83 and when the excess air ratio of the exhaust gas is between 0.75 and 0.83, controlling the oxygen concentration, using the CPU, of the exhaust gas at an inlet of the NOx purifying catalyst between 1.1 and 1.2% by volume to enhance a partially-oxidized reaction of hydrocarbons in the exhaust gas and generate hydrogen and carbon monoxide from the hydrocarbons in the exhaust gas.

* * * * *